July 17, 1956 — F. R. CURTISS — 2,755,049
TREE STAND
Filed May 3, 1955
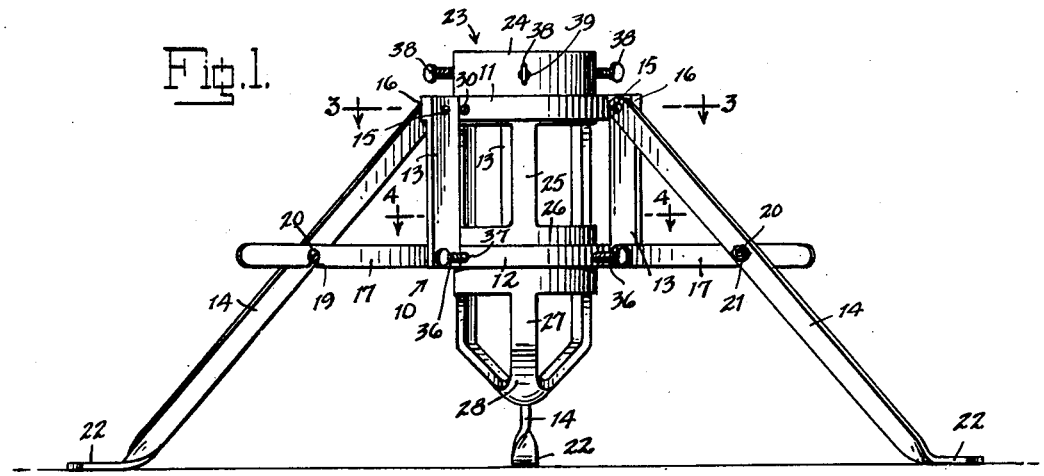
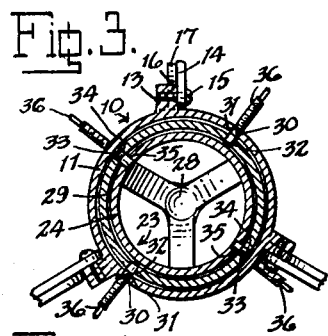
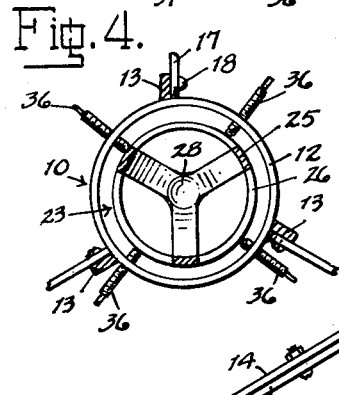
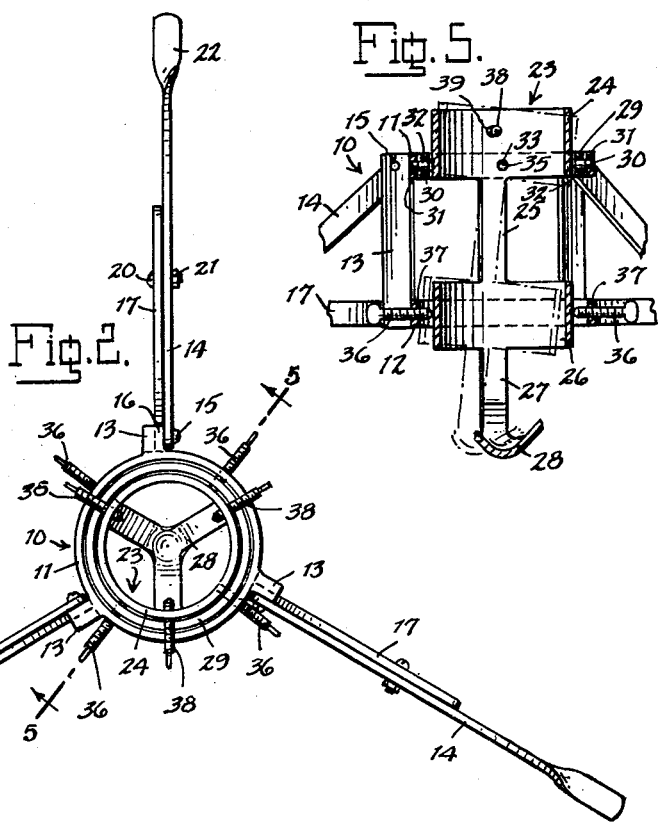
Inventor
FRANK R. CURTISS

United States Patent Office 2,755,049
Patented July 17, 1956

2,755,049
TREE STAND

Frank R. Curtiss, New Haven, Conn.

Application May 3, 1955, Serial No. 505,798

3 Claims. (Cl. 248—46)

The present invention relates to an improved tree stand particularly for use in supporting Christmas trees in an upright position.

The usual Christmas tree stand heretofore in use consists of a socket structure supported on suitable legs and having its vertical axis fixed with respect to the floor, the butt of the tree trunk being engaged in the socket and retained therein by radially disposed screws or by wedges. The tree may be initially received in the socket in a tilted position, or the butt of the tree trunk may be out of line with the trunk, and it is necessary, in order to position the trunk in a substantially vertical position, to adjust the position of the butt in the socket by manipulating the tree holding screws or wedges, first loosening and then tightening them. This is not only an extremely difficult and awkward operation, but may impair the holding effect of the screws or wedges as a result of breaking or softening of the wood fibers.

It is an object of the present invention to provide a tree stand in which the tree butt may be initially permanently fixed in the stand, and may thereupon be adjusted at any desired angle without disturbing the means securing the tree in place. In particular, it is proposed to provide a tree stand having a socket member in which the butt of the trunk is secured, and which socket member is supported within a floor-engaging stand upon a gimbal, means being provided for fixedly securing the socket member in its adjusted position.

A further object is to provide a tree stand having a socket member supported upon a gimbal, and having adjustment means spaced a substantial distance below the gimbal to fix the position of adjustment of the socket member, and whereby a substantial leverage is obtained as between the gimbal and the adjustment means for the easy adjustment of the socket member.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a front elevation of a tree stand, according to the invention;

Fig. 2 is a top plan view;

Fig. 3 is a horizontal sectional view taken along the line 3—3 of Fig. 1;

Fig. 4 is a horizontal sectional view taken along the line 4—4 of Fig. 1; and

Fig. 5 is a vertical sectional view taken along the line 5—5 of Fig. 2, the dot-and-dash lines showing a tilted position of the socket member.

Referring to the drawings the tree stand, according to the illustrated exemplary embodiment of the invention, comprises a tripod type floor-engaging base consisting of a centrally disposed annular body or cage member, indicated generally as 10, having a relatively large diameter vertically disposed cylindrical passage therethrough, this member being of skeleton construction for the sake of lightness, and including upper and lower vertically spaced cylindrical ring portions 11 and 12 connected at their outer peripheries by three equally spaced vertical bars 13. These bars constitute bracket supports for the three radial legs 14 of the stand, each connected at its upper end to one of the brackets by a pivot screw 15 engaged in a projected boss 16 at the upper end of the bracket, the projection of this boss being substantially equal to the thickness of the metal from which the legs are formed.

Each leg is provided with a brace bar 17 pivotally connected at its inner end by a pivot screw 18 engaged in the lower end portion of the respective bracket 13, and is provided at its lower edge, in inwardly spaced relation to its outer end, with a notch 19 engaged by a screw 20 provided in the leg 14 intermediate its ends, a tightening nut 21 being screwed upon its end at the opposite side of the leg from the side engaged by the bar 17. The legs are formed of flat strip stock and at their outer ends are twisted to form floor-engaging foot portions 22.

When the stand is set up, the brace bar 17 may be secured by tightening the head of the screw 19 against it. However, the brace bar may be loosely engaged, if desired, so that it may be readily disengaged, the vertical load on the stand causing the legs to spread and thus force the screws outwardly into locking engagement in the notches. When the stand is stored away, the brace bars 17 are disengaged from the legs and the legs swung into substantially vertical position, so that the stand will occupy a relatively small storage space.

Within the body or cage member 10 of the stand, there is disposed, for universal adjustment movement, a socket member indicated generally as 23, and which is also preferably of skeleton form for lightness, comprising an upper cylindrical band portion 24 connected by vertical bar portions 25 to a lower cylindrical band portion 26, and the latter having bar portions 27 extending downwardly from its lower edge and terminating in a downwardly and inwardly tapered pocket portion 28. This member is adapted to receive the butt end of the tree trunk with its lower end resting in the lower pocket portion 28.

The socket member 23 is of substantially less diameter and greater vertical height than the body or cage member 10, and is so proportioned that the upper band portion 24 has its upper end substantially above the ring 11 and its lower end in line with the ring, and the lower band portion 26 has its central portion substantially in line with the lower ring 12.

A gimbal supports the socket member 23 with the body or cage member 10 and consists of a gimbal ring 29 disposed in the annular space between the ring 11 and the band 24, being pivotally mounted upon the ring 11 by diametrically opposite pivot pins 30 having threaded portions screwed into threaded holes 31 in the ring 11 and having their pin ends rotatably engaged in holes 32 in the gimbal ring 29. Upon an axis at right angles to the axis of the pins 30, similar pivot pins 33 pivotally support the socket member from the gimbal ring, these pins being screwed into threaded holes 34 in the gimbal ring and their pin ends being rotatably engaged in holes 35 in the band portion 24 of the socket member. Thus the socket member is supported for free tilting movement in any direction at a point relatively near its upper end, and due to its substantial vertical length below the pivot support, substantial leverage may be obtained to effect adjustment when a tree is supported therein by pressure applied at a point near the lower end of the socket.

For this purpose, a series of radially disposed set screws 36 are engaged in threaded holes 37 in the lower ring portion 12 of the body member, these preferably being four in number and directly below the pivots of the gimbal. By adjusting these screws the socket member may be pivoted upon the gimbal in any desired direction, and when the desired angular tilt is established to properly support the tree in the desired vertical position of its trunk, the set screws 36 are engaged with the band portion 26 to thus fix the position of adjustment.

The butt of the tree is secured in the socket member 23 by a plurality, preferably three, of equally spaced radial set screws 38 engaged in threaded holes 39 of the band portion 24 in spaced relation above the upper ring portion 11 of the body member, so that sufficient clearance is provided for easy manipulation of the set screws by the fingers. These set screws simply hold the butt in the socket by being screwed into contact therewith, and as they are not required to force the butt into an adjusted position within the socket, as with tree stands heretofore in use, they need not be further adjusted after once being engaged with the butt of the tree. Thus their initial tight engagement with the butt of the tree will not be disturbed. Once the tree is secured in the socket member 23, it may be easily adjusted to bring its trunk into substantially vertical position when viewed from any side, simply by holding it in the desired position and thereupon fixing the position of adjustment by means of the set screws 36. The dot-and-dash lines in Fig. 5 designate the substantial degree of universal tilt that may be imparted to the socket member.

What is claimed is:

1. A tree stand comprising a base including ground-engaging means and having an annular wall defining a vertically extending circular opening open at its upper end, a tree-holder normally vertically disposed within said opening having a cylindrical wall defining a normally vertically extending socket open at its upper end to receive a tree butt, the external diameter of said tree-holder wall being substantially less than the internal diameter of said base wall to provide an annular space between said walls, a gimbal ring having an internal diameter greater than the external diameter of said tree holder wall and an external diameter less than the internal diameter of said base wall and disposed in concentric relation within said annular space, a pair of pivot pins connecting said base wall to said gimbal ring at diametrically opposite sides of said ring and having a common tilting axis disposed diametrically of said ring, a second pair of pivot pins connecting said gimbal ring to said tree-holder wall at diametrically opposite sides of said ring and having a common tilting axis disposed diametrically of said ring and at a right angle to said first mentioned tilting axis, and whereby said tree-holder is universally tiltably adjustable from its normally vertical position within said opening of said base, and securing means acting between said base and said tree holder and securing said tree holder against movement in adjusted positions thereof.

2. The tree stand as defined in claim 1, wherein said tree holder wall extends substantially below said gimbal ring, and wherein said securing means comprises a plurality of set screws in threaded adjustable engagement in said base wall and radially disposed in substantially equally spaced relation and in a common horizontal plane intermediate said gimbal ring and the lower end of said tree holder wall, the inner ends of said set screws being engaged with said tree holder wall and securing it against movement in adjusted positions thereof.

3. The tree stand as defined in claim 1, wherein said ground-engaging means comprise a plurality of leg members pivotally connected at their inner ends to said base wall in substantially equally spaced relation circumferentially in a common horizontal plane, a plurality of brace members pivotally connected at their inner ends to said base wall in substantially equally spaced relation circumferentially in a common horizontal plane substantially spaced below said horizontal plane of said pivotal connections of said leg members, and means acting between said brace members and said leg members at points intermediate the ends of said leg members and detachably securing said brace members to said leg members.

References Cited in the file of this patent

UNITED STATES PATENTS

| | | |
|---|---|---|
| 594,491 | Silverman | Nov. 30, 1897 |
| 837,415 | Marriott | Dec. 4, 1906 |
| 2,493,043 | Stipsky | Jan. 3, 1950 |
| 2,681,780 | Santoro | June 22, 1954 |